Sept. 7, 1948.   O. K. NUTTER   2,448,681
FISH BITE SIGNAL DEVICE
Filed Sept. 21, 1944
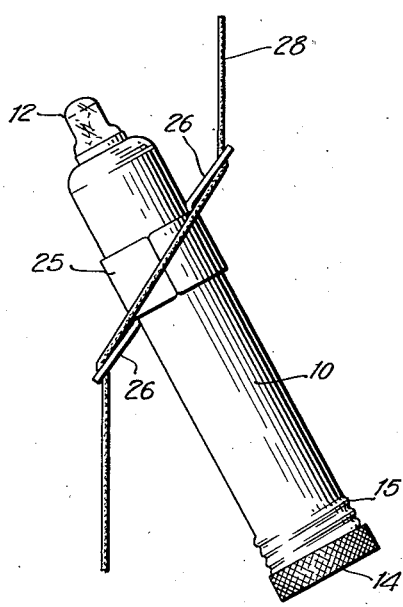
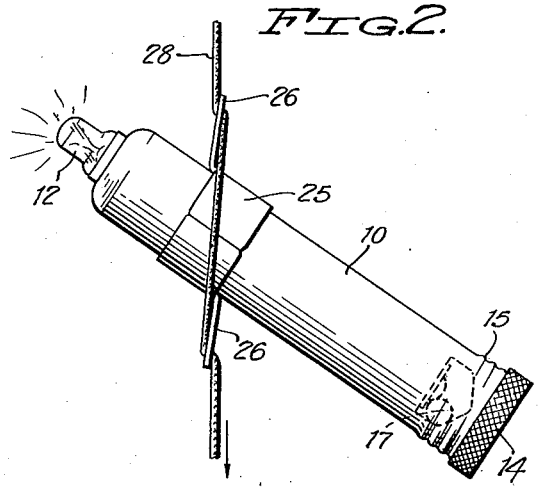
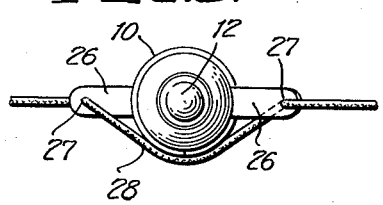
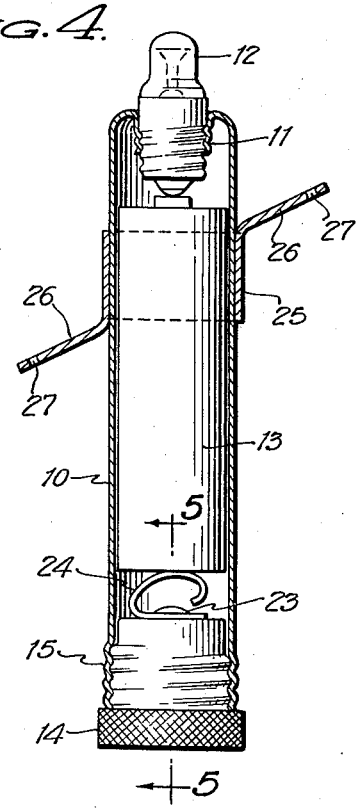
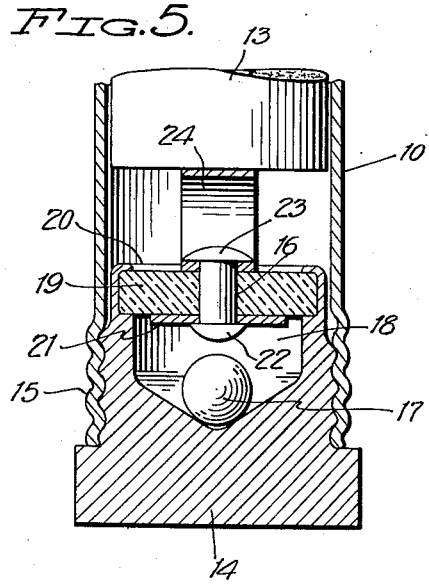
INVENTOR
OKEY K. NUTTER
BY
Ely & Pattison
ATTORNEYS Patented Sept. 7, 1948

2,448,681

UNITED STATES PATENT OFFICE 2,448,681

FISH BITE SIGNAL DEVICE

Okey K. Nutter, Jamaica, N. Y.

Application September 21, 1944, Serial No. 555,128

3 Claims. (Cl. 43—17)

1

This invention relates to signalling fishing tackle which may be used advantageously at night to indicate or give a visual signal when a fish has been hooked or is taking the bait.

An object of the invention is the provision of a signal device in the form of an attachment which may be easily applied to the line of fishing tackle for the purposes stated.

A further object of the invention is the provision of a device of the indicated character which may be used in conjunction with a set fishing line, or a fishing line on a set pole.

The nature of the invention and its distinguishing features and advantages will appear when the following specification is read in connection with the accompanying drawing, in which Figure 1 is a side view showing a portion of a fishing line with the signalling device of the present invention applied thereto disposed in the non-signalling position.

Figure 2 is a view similar to Figure 1, but showing the device in the signalling position as would occur when a pull is exerted on the hook end of the line.

Figure 3 is a view of the device as applied to the line and looking down at the top of the device.

Figure 4 is an enlarged vertical sectional view through the device.

Figure 5 is an enlarged sectional view taken on the line 5—5 of Figure 4.

As stated, the device is designed and adapted to be used primarily for night fishermen using an ordinary fishing line on a set pole, or a set line. The device includes a casing 10 of metal so as to conduct electric current. The upper end of the casing 10 has an integral screw socket 11 to receive a standard electric lamp 12 whose threaded base portion is in electrical connection with the casing 10. A cell 13 provides a source of electric current. The cell 13 is of a size to loosely fit in the casing 10. A plug 14 is adapted to be removably secured to the lower threaded end 15 of the casing 10. The plug 14 is made of metal to conduct the electric current from the casing 10. The plug 14 carries a switch consisting of a fixed contact 16, and a movable contact 17 in the form of a metal ball which is disposed in a cavity 18 in the plug, and rolls in contact with the conical wall of the cavity into and out of engagement with the contact 16, when the device is tilted in a manner to be explained.

The contact 16 is carried by an insulator disk 19 held in place by the inturned edge portion 20 on the shouldered section of the plug above the cavity 18. A metal disk 21 surrounds the contact

2

16 and is held in place by a head 22 on the lower end of the contact to provide an enlarged conducting surface. A head 23 on the upper end of the contact 16 secures a spring 24 against the disk 19 in electrical connection with said contact 16. The spring 24 constitutes resilient means engageable with the cell 13 to establish electrical connection between the contact 16 and the cell 13, and to retain the cell disposed in a position in which its central terminal is in contact with the central electrode of the lamp 12, as shown in Figure 4. When the ball 17 is moved to a position in which it engages the contact 16, while contacting the conical wall of the cavity 18, current will flow in a closed circuit from the cell 13 to the lamp filament to the casing 10, plug 14, contacts 17 and 16, spring 24 and back to the shell terminal of the cell 13.

To attach the device to a fishing line in operative relation thereto, there is provided means consisting of a spring clip or clamping member 25 in the form of a split ring or circular band having laterally projecting oblique arms 26 which are diametrically opposite each other with respect to the circumference of the clip 25. Each arm 26 has a hole 27 therein near the outer end. The clip 25 is clampingly engageable with the casing 10 in the desired adjusted position thereon. A fishing line 28 is brought downwardly through the hole 27 in one arm 26 and from the underside of the latter over on top of the other arm and then downwardly through the hole 27 therein so that the line is disposed as shown in Figure 1. By adjusting the clip 25 to a set position and interlacing the line 28 as stated, the device is held in a tilted non-signalling position in which the ball 17 is out of engagement with the contact 16 to keep the circuit to the lamp 12 open. When a downward pull is exerted on the hook end of the line by a hooked fish or one taking the bait, the device will be tilted into a signalling position, as shown in Figure 2. In that position the ball 17 will have rolled into contact with the disk 21, or the head 22 of the fixed contact 16, thereby closing the circuit through the lamp 12 to light the same and so giving a visual signal to the fisherman that a fish has been hooked or about to be hooked.

From the foregoing it will be understood the device as a unit may be readily applied to a line forming a part of the fishing tackle including a pole to which the line is fixed, or the unit may be applied to a drop line not secured to a pole. Also, the parts of the device may be removed and replaced whenever necessary or desired.

Having thus described my invention, what I claim as new and desire to secure by Letters Patent is:

1. Means for securing a fishing line to a signalling device so that the device normally is held in a non-signalling position and is movable into a signalling position in response to a pulling force exerted on the hook end of the line, said means consisting of a clamping member applicable to said device, and laterally disposed line-engaging arms on said member, arranged obliquely and diametrically opposite each other.

2. Means for securing a fishing line to a signalling device so that the device normally is held in a non-signalling position and is movable into a signalling position in response to a pulling force exerted on the hook end of the line, said means consisting of a clamping member applicable to said device, and laterally disposed line-engaging arms on said member, said clamping member being in the form of a split ring, and said arms being arranged obliquely on said clamping member.

3. Means for securing a fishing line to a signalling device comprising a casing, said means normally holding the device in upright but slightly inclined position, the device being movable into a tilted signalling position when a pulling force is exerted on the lower end of the line, said means consisting of a clamping member attached to the device and engaging said line, said device comprising a casing with an electric lamp at its upper end and having its lower end closed by a metal member having a conical cavity with upward inclined sides therein and a loosely contained contact element in said cavity which is free to move upward along the interior inclined surface thereof to close the circuit of the lamp when the lower end of the line is pulled to tilt said casing.

OKEY K. NUTTER.

REFERENCES CITED

The following references are of record in the file of this patent:

UNITED STATES PATENTS

| Number | Name | Date |
| --- | --- | --- |
| 1,358,639 | King | Nov. 9, 1920 |
| 2,001,109 | Petrie | May 14, 1935 |
| 2,172,167 | Leventhal | Sept. 5, 1939 |
| 2,205,352 | Fisher | June 18, 1940 |
| 2,252,358 | Tosi | Aug. 12, 1941 |
| 2,280,457 | Sutcliffe | Apr. 21, 1942 |
| 2,329,790 | Seigle | Sept. 21, 1943 |